(12) United States Patent
Kroupnova et al.

(10) Patent No.: US 8,812,261 B2
(45) Date of Patent: Aug. 19, 2014

(54) METHOD AND APPARATUS TO AUTOMATICALLY CREATE VIRTUAL SENSORS WITH TEMPLATES

(75) Inventors: Natalia Kroupnova, Sunnyvale, CA (US); Aleksey Yanovich, Santa Clara, CA (US); Thorsten Kril, Santa Clara, CA (US); Mikhail B. Kozine, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1317 days.

(21) Appl. No.: 12/069,875

(22) Filed: Feb. 12, 2008

(65) Prior Publication Data

US 2009/0055692 A1    Feb. 26, 2009

Related U.S. Application Data

(60) Provisional application No. 60/966,021, filed on Aug. 23, 2007.

(51) Int. Cl.
*G06F 11/30* (2006.01)
*G21C 17/00* (2006.01)
*G05B 23/02* (2006.01)

(52) U.S. Cl.
CPC .......... *G05B 23/021* (2013.01); *G05B 23/0254* (2013.01)
USPC ....................................................... 702/182

(58) Field of Classification Search
CPC .......................... G05B 23/0254; G05B 23/021
USPC ....................... 702/116, 123, 182; 706/13, 59
See application file for complete search history.

(56) References Cited

U.S. PATENT DOCUMENTS

| 5,864,773 | A  | * | 1/1999 | Barna et al. ..................... 702/85 |
| 6,223,214 | B1 | * | 4/2001 | Tufty et al. ..................... 709/217 |
| 6,772,034 | B1 |   | 8/2004 | Shi et al. |
| 6,839,713 | B1 |   | 1/2005 | Shi et al. |
| 6,904,391 | B2 | * | 6/2005 | Merkin et al. ................. 702/188 |
| 6,970,758 | B1 |   | 11/2005 | Shi et al. |
| 7,020,701 | B1 |   | 3/2006 | Gelvin et al. |
| 7,752,360 | B2 | * | 7/2010 | Galles ............................ 710/62 |

(Continued)

FOREIGN PATENT DOCUMENTS

JP    2005135075 A  *  5/2005  ............. G05B 23/02

OTHER PUBLICATIONS

Staroswiecki et al., "Analytical redundancy relations for fault detection and isolation in algebraic dynamic systems", 2001, Automatica 37, pp. 687-699.*

(Continued)

*Primary Examiner* — Jonathan C Teixeira Moffat
*Assistant Examiner* — Regis Betsch
(74) *Attorney, Agent, or Firm* — Blakely, Sokoloff, Taylor & Zafman LLP

(57) ABSTRACT

A method and apparatus for automatically providing a virtual sensor have been described. In one embodiment, a method for automatically providing a virtual sensor includes receiving a plurality of virtual sensor templates from a server. The method further includes selecting a virtual sensor template from the plurality of virtual sensor templates. The selected virtual sensor template has an algorithm to provide a desired functionality. The method further includes selecting at least one parameter to configure the selected virtual sensor template. The method further includes automatically creating a virtual sensor associated with the selected virtual sensor template.

18 Claims, 16 Drawing Sheets

(56) References Cited

U.S. PATENT DOCUMENTS

| | | |
|---|---|---|
| 2003/0144746 A1 | 7/2003 | Hsiung et al. |
| 2006/0026267 A1* | 2/2006 | Godin et al. ................ 709/220 |
| 2006/0165890 A1* | 7/2006 | Kaushal et al. ............ 427/248.1 |
| 2006/0184264 A1 | 8/2006 | Willis et al. |
| 2006/0259259 A1 | 11/2006 | Rozenboim et al. |
| 2007/0150235 A1 | 6/2007 | Lev-Ami et al. |
| 2008/0103617 A1 | 5/2008 | Subramanian et al. |
| 2008/0312756 A1* | 12/2008 | Grichnik et al. ................ 700/29 |
| 2009/0086023 A1* | 4/2009 | McCubbrey .................. 348/143 |
| 2011/0010318 A1* | 1/2011 | Roverso .......................... 706/12 |

OTHER PUBLICATIONS

Maquin et al., "Generation of Analytical Redundancy Relations for FDI purposes", 1997, IFAC symposium on Diagnostics for Electrical Machines Power Electronics and Drives, SDEMPED'97.*

* cited by examiner

| Description | VID | Location | Index | Slot | Side | Datasource |
|---|---|---|---|---|---|---|
| Ambient_Temperatue_by_probe | SVID_102201 | A | 1 | | | DSRTC |
| Ambient_Temperatue_by_probe | SVID_102201 | A | 2 | | | DSRTC |
| Ambient_Temperatue_by_probe | SVID_102241 | A | 3 | | | DSRTC |
| Ambient_Temperatue_by_probe | SVID_102261 | A | 4 | | | DSRTC |
| Ambient_Temperatue_by_probe | SVID_102281 | A | 5 | | | DSRTC |
| Ambient_Temperatue_by_probe | SVID_102301 | A | 6 | | | DSRTC |
| Ambient_Temperatue_by_probe | SVID_102321 | A | 7 | | | DSRTC |
| Ambient_Temperatue_by_probe | SVID_102341 | A | 8 | | | DSRTC |
| Ambient_Temperatue_by_probe | SVID_102361 | A | 9 | | | DSRTC |
| Centura_Build | SVID_104141 | A | | | | |
| Chamber Data State | SVID_104421 | A | | | | |

METHOD AND APPARATUS TO AUTOMATICALLY CREATE VIRTUAL SENSORS WITH TEMPLATES

RELATED APPLICATIONS

This application claims the priority benefit of U.S. Provisional Patent Application No. 60/966,021, filed on Aug. 23, 2007 and entitled, "VIRTUAL SENSORS," which is incorporated herein by reference.

TECHNICAL FIELD

Embodiments of the present invention relate to automatically creating virtual sensors for manufacturing and process control using templates.

BACKGROUND

Many industries employ sophisticated manufacturing equipment that includes multiple sensors and controls, each of which may be carefully monitored during processing to ensure product quality. One method of monitoring the multiple sensors and controls is statistical process monitoring (a means of performing statistical analysis on sensor measurements and process control values (process variables)), which enables automatic detection and/or diagnosis of faults. A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Accordingly, one goal of statistical process monitoring is to detect and/or diagnose faults before they produce such defects.

One industry approach for statistical process monitoring includes collecting data, acquiring and storing data, analyzing data, and acting. Data is collected by various sensors located on the manufacturing equipment. However, these sensors may not be exposed or accessible. Data is then acquired from the manufacturing equipment and saved or stored in a database that can be located on a server. The data is acquired from various types of manufacturing equipment having different configurations and protocols which slows and complicates the acquisition of the data into the database.

Next, the data is analyzed which requires filtering (e.g., specific runs of semiconductor wafer) and possibly transformations of units. Also, the data must be pre-processed using complex algorithms (e.g., virtual sensors) in order to perform a meaningful analysis. Finally, action must be taken based on the data analysis. For example, faults or errors may indicate a malfunctioning equipment or a need to modified a process parameter immediately on the fly during real-time. The action usually occurs too late because the data analysis requires a significant amount of time. Furthermore, updating or creating new virtual sensors requires restarting or reinstalling the software application being run on a manufacturing machine.

BRIEF DESCRIPTION OF THE DRAWINGS

The present invention is illustrated by way of example, and not by way of limitation, in the figures of the accompanying drawings and in which:

FIG. 9 illustrates an exemplary CDT configuration user interface for selecting a particular data tag in accordance with one embodiment of the invention;

DETAILED DESCRIPTION

Figure 1:
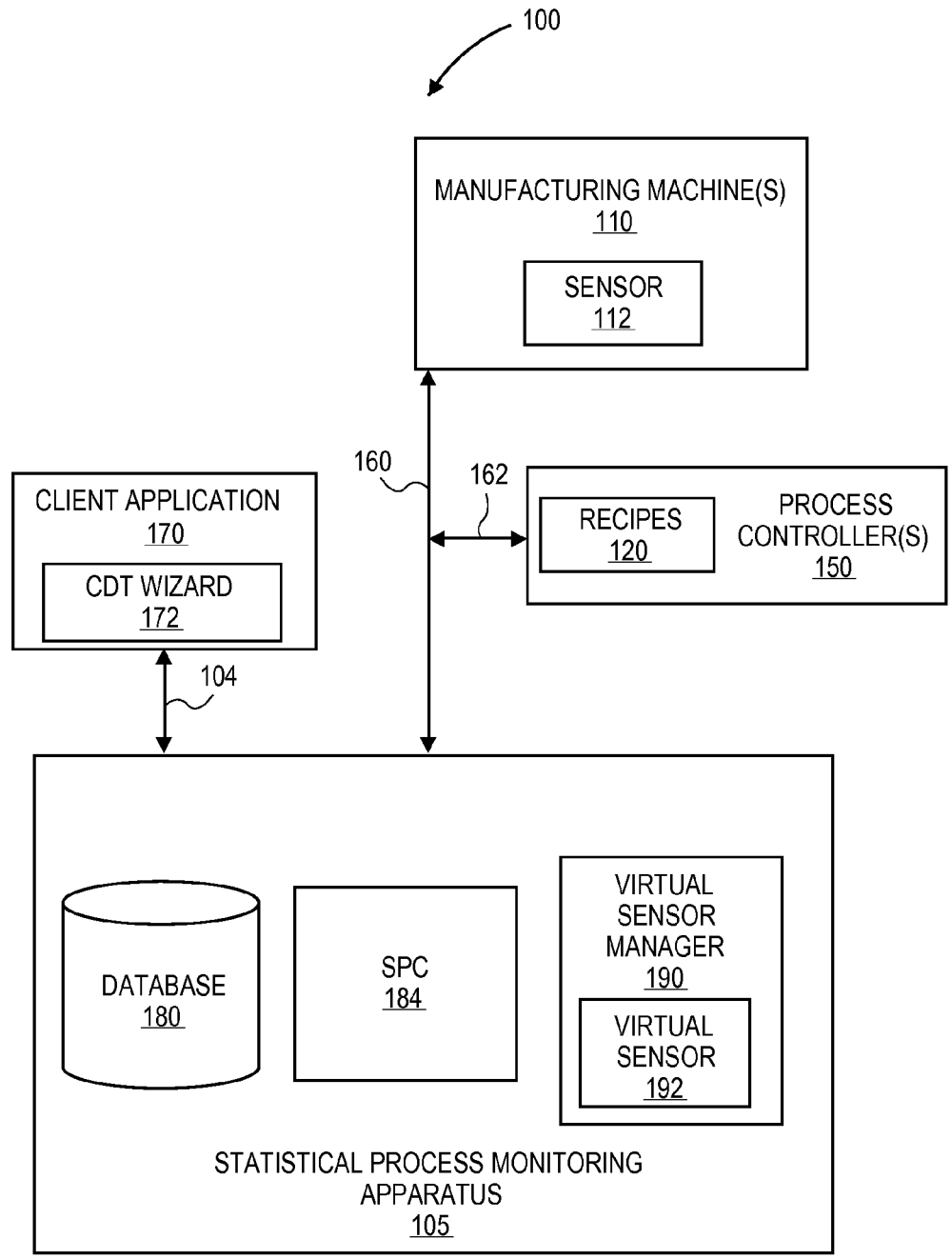
FIG. 1 illustrates one embodiment of a statistical process monitoring system.

Described herein is a method and apparatus for creating virtual sensors. In one embodiment, a method for creating virtual sensors includes presenting a plurality of virtual sensor templates in a user interface. The method further includes selecting a virtual sensor template from the plurality of virtual sensor templates. The selected virtual sensor template has an algorithm to provide a desired functionality. The method further includes selecting at least one parameter to configure the selected virtual sensor template. The method further includes automatically creating a virtual sensor using the selected virtual sensor template.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

The following description provides details of a statistical process monitoring system that monitors processes run on manufacturing devices to detect and/or diagnose faults (manufacturing irregularities). In one embodiment, the statistical process monitoring system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the statistical process monitoring system may be used to monitor the manufacture of other products, such as automobiles. The manufacture of such other products may also require many different processing steps by various manufacturing machines.

FIG. 1 illustrates one embodiment of a statistical process monitoring system. The statistical process monitoring system 100 includes a statistical process monitoring apparatus 105 coupled with one or more manufacturing machines 110 and one or more process controllers 150 by data communication links 160 and 162. A client application 170 is coupled to the statistical process monitoring apparatus 105 via data communication link 104. The client application 170 includes a calculated data tag (CDT) wizard 172 for automatically creating virtual sensors or CDTs using templates. As will be discussed in more detail below, a virtual sensor is a script executed in real-time during data collection which can provide arbitrary complex logic functions. Throughout this disclosure, the terms "virtual sensor" and "calculated data tag" (CDT) may be used interchangeably.

The statistical process monitoring system 100 may include all manufacturing machines 110 in a factory (e.g., a fabrication facility). Alternatively, the statistical process monitoring system 100 may include only some manufacturing machines 110 in the factory, such as all of the manufacturing machines 110 that run one or more specific processes.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Each of the manufacturing machines 110 may include multiple sensors 112 for monitoring processes run on the manufacturing machines 110. One type of sensor 112 that may be included in the manufacturing machine is a temperature sensor 112. Examples of other sensors 112 include pressure sensors 112, flow rate sensors 112, or any other sensors 112 that monitor physical conditions of a manufacturing process or physical properties of a work piece manufactured by the manufacturing machines 110.

Each manufacturing process that is performed on a manufacturing machine 110 is characterized by various physical conditions and properties measured by the sensors 112, and by various operating parameters, collectively referred to as process data. Each distinct physical condition or property measured by sensors 112, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). The sensors 112, manufacturing machines and process controllers may be monitored during processing to gather the process variables at successive points in time.

In one embodiment, each process variable applies to a specific process. Alternatively, one or more process variables may apply to only portions of a specific process. In one embodiment, sensor measurements and operating parameters for different steps in a process represent distinct process variables (modeled as additional dimensions in model space). This may be useful, for example, if a manufacturing process being performed in a machine has multiple steps with different operating parameter settings. For example, in a three step manufacturing process, a susceptor temperature during the three steps would be treated as three distinct process variables. The division of process steps into separate dimensions in model space may be advantageous, for example, when a single process deposits multiple layers on a workpiece, or when different steps of a process expose the workpiece to different process conditions (e.g., pressure, temperature, etc.).

Process controllers 150 control operating parameters of manufacturing machines 110. For example, process controllers 150 may control chamber temperature, vacuum pumps, gas injection systems, etc. of manufacturing machines 110. Process controllers 150 may store one or more process recipes (recipes) 120. Each recipe 120 may define operating parameters of a manufacturing machine 110 at each step of a process. In one embodiment, recipes 120 may be loaded into manufacturing machines 110 by process controllers 150.

Data communication links 160 may include conventional communication links, and may be wired or wireless. Data may be transmitted between the manufacturing machines 110, the process controllers 150 and the statistical process monitoring apparatus 105 in a raw or processed format. In one embodiment, a semiconductor equipment communications standards (SECS) interface is used. In other embodiments, a generic model for communications and control of manufacturing equipment (GEM) interface, a SECS/GEM interface, a high speed SECS message services (HSMS) interface, etc., may be used.

The statistical process monitoring apparatus 105 may be a single server that analyzes incoming process data from the manufacturing machines 110, sensors 112 and process controllers 150. Alternatively the statistical process monitoring apparatus 105 may include multiple servers and/or computers. The statistical process monitoring apparatus in one embodiment includes a database 180, a statistical process control (SPC) module 184, and a virtual sensor manager 190 which may include at least one virtual sensor 192. In one embodiment, the statistical process monitoring apparatus 105 is included in one or more of the process controllers 150. Alternatively, the process monitoring apparatus 105 may be a distinct separate apparatus.

The database 180 stores raw data and other types of data that may originate from the manufacturing machine(s). In one embodiment, the database 180 is a single storage device of a computer or server of the statistical process monitoring apparatus 105. Alternatively, the database 180 may be external to the statistical process monitoring apparatus 105. In one embodiment, the database 180 includes multiple storage devices, some of which may include redundant copies of data for backup.

Process measurement data (process data) may be stored in the database. The stored process data may be used to show drifts and trends for each of the manufacturing machines 110, for processes run on the manufacturing machines 110, etc. The SPC module 184 performs data processing and analysis functions of data stored in the database 180 and also data generated by one or more visual sensors provided by the visual sensor manager 190. A virtual sensor 192 is a script executed in real-time during data collection which can provide arbitrary complex logic functions. Data values calculated by virtual sensors 192 are available for analysis modules (e.g., SPC module) along with tool sensors in real-time during data collection (i.e., as soon as data values are calculated).

In an embodiment, the process monitoring apparatus 105 includes the statistical process control module 184 that analyzes data. The process monitoring apparatus 105 further includes the database 180 that stores raw data received from at least one manufacturing machine 110 and stores analyzed data received from the statistical process control module 184. The virtual sensor manager 190 or CDT manager is communicatively coupled to the database 180 and the statistical process control module 184.

The CDT manager 190 provides at least one calculated data tag 192 that may be created in real-time during data collection. A CDT wizard 172 may be used to facilitate creation of calculated data tags. In one embodiment, the CDT wizard 172 is hosted by the client application 170. In another embodiment, the CDT wizard 172 is stored and executed on the process monitoring apparatus 105. In this alternative embodiment, the client application 170 accesses the CDT wizard 172 using a browser. A CDT wizard 172 displays a plurality of calculated data tag templates in a user interface presented on client application 170. The CDT wizard receives a first user input to select a calculated data tag template from the plurality of calculated data tag templates. Each CDT template including the selected CDT template is associated with an algorithm to provide a desired functionality (e.g., fault detection, error detection, process monitoring). The CDT wizard causes a CDT associated with the selected calculated data tag template to be automatically created.

In one embodiment, the CDT wizard also receives user input to select at least one data tag (e.g., ambient_temperature_by_probe, chamber data state) associated with a data source. The CDT wizard may further receive user input to select values of at least one parameter associated with the selected CDT template in order to configure the CDT template. The parameter may be for example, selecting the data tag occurs by filtering a list of data tags by at least one of location, kind, collection plan, and chart plan. The CDT wizard may cause the selected data tag to be applied to the selected CDT template in real-time.

The SPC module is further configured to automatically collect the data associated with the CDT and in conjunction with the CDT manager 190 automatically execute the CDT associated with the selected CDT template in real-time based on the algorithm performing calculations on the collected data to generate an output of the CDT with the output being used by at least one data analysis module (e.g., SPC 184) in real-time. The collected data is acquired from at least one of an external physical sensor associated with a machine tool, an additional CDT, a database, the machine tool, and a real sensor attached to the machine tool.

Real-time actions or events occur immediately or as soon as possible during data collection without having to wait for other operations in contrast to prior approaches that require collecting data, acquiring and storing data, analyzing data, and then acting in a delayed manner.

Creating and executing the at least one CDT in real-time occurs without having to restart a data analysis software application that performs functionality associated with the statistical process control module. Additionally, a new CDT template can be added to a directory having the plurality of virtual sensor templates in real-time. The new CDT template can then be used to create one or more new virtual sensors in real-time.

The statistical process control module 184 analyzes the output of the calculated data tag in real-time and generates an error notification in real-time based on analyzing the output of the calculated data tag in real-time. The statistical process control module can stop a manufacturing machine in real-time in response to analyzing the output of the at least one calculated data tag in real-time and determining a fault condition.

Virtual sensors or calculated data tags enable the user to perform predefined calculations on raw signals, and use the results to perform SPC analysis. They are particularly powerful because they can be used to create an artificial parameter that is derived from the output of one or more physical sensors. Importantly, they can utilize the element of time to create completely new parameters that a physical sensor simply cannot measure. In one embodiment, virtual sensors perform predefined calculations on raw signals, and use the results to perform SPC analysis and multivariate analysis. For example, virtual sensors can be designated as data collection plans and virtually sense when certain events or conditions occur.

In another embodiment, virtual sensors perform calculations on data from real sensors. In other embodiments, virtual sensors perform calculations on data from real sensors, configuration data (e.g., chamber configuration), process set-points, external physical sensors, and/or other virtual sensors.

In one embodiment, real-time tool (e.g., manufacturing machine) data is collected and stored from the tools into the database. Other information stored in the database may include events and/or alarms associated with the tools. The tool data is stored in a context such as process recipe, wafer data, lot name, etc. The SPC module using collected data and/or real-time data from the visual sensors may generates real time and historical charting including overlying these charts in addition to providing trend charting.

Real-time actions based on discovering a fault or error condition may include stopping a tool or process chamber based on the analysis results and/or notification email to a responsible party. For example, production and research and development engineers can monitor the real-time data and analysis.

Figure 2A:
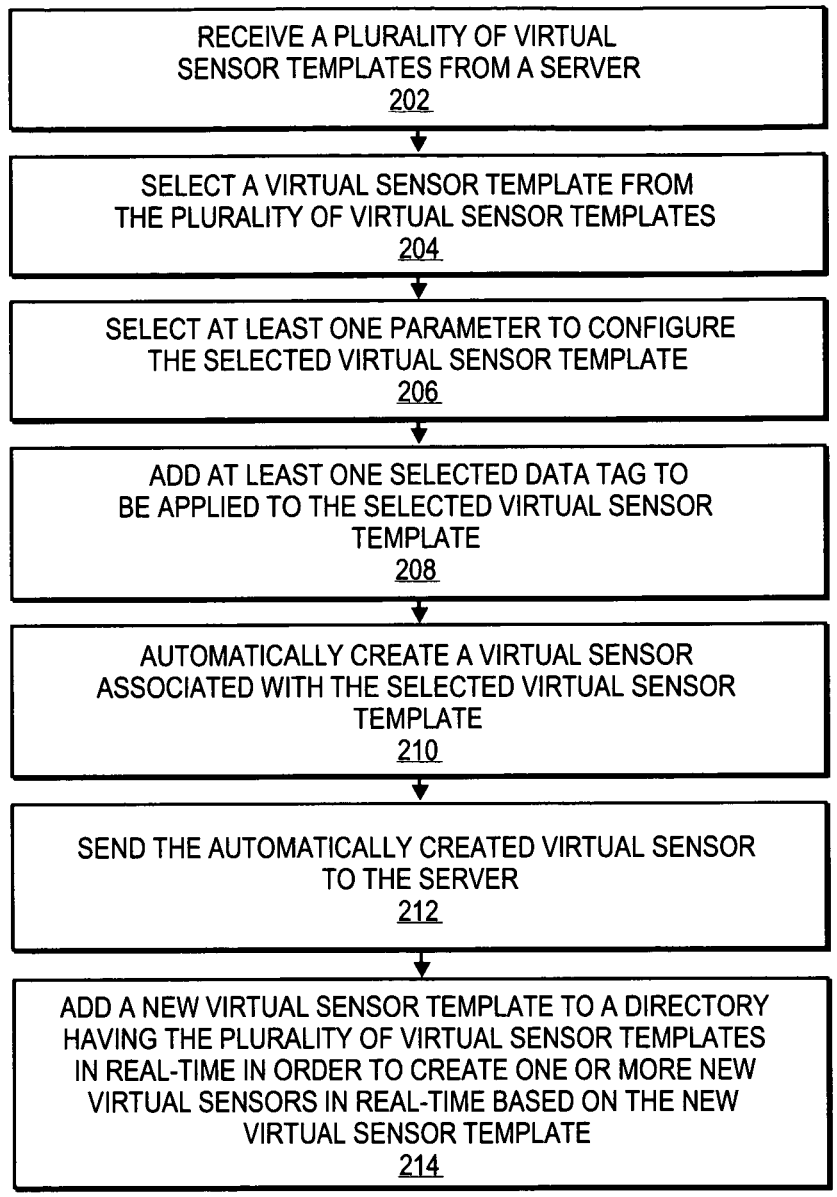
FIG. 2A illustrates a flow diagram of one embodiment for a method of automatically providing a virtual sensor in real-time.

FIG. 2A illustrates a flow diagram of one embodiment for a method of automatically providing real-time virtual sensors. The method may be performed by processing logic that may comprise hardware (e.g., circuitry, dedicated logic, programmable logic, microcode, etc.), software (such as instructions run on a processing device), or a combination thereof. In one embodiment, the method is performed by the client application 170 of FIG. 1.

Referring to FIG. 2A, the method begins by receiving a plurality of virtual sensor templates from a server (e.g., statistical process monitoring apparatus) at block 202. The method further includes selecting a virtual sensor template from the plurality of virtual sensor templates (e.g., based on user input) at block 204. Each virtual sensor template including the selected virtual sensor template has an algorithm to provide a desired functionality (e.g., fault detection, error detection, process monitoring). The method further includes selecting (e.g. based on user input) at least one parameter to configure the selected virtual sensor template at block 206. This may occur by selecting at least one data tag from a data source. Alternatively or in addition to, this may occur by selecting values of at least one parameter (e.g., recipe step) associated with the selected virtual sensor template. Selecting the data tag may occur by filtering a list of data tags by at least one of location, kind, collection plan, and chart plan. The method further includes adding the at least one selected data tag to be applied to the selected virtual sensor template at block 208.

The method further includes automatically creating a virtual sensor associated with the selected virtual sensor template in real-time at block 210 based on selected parameters and data tags as described above, and sending the created virtual sensor to the server at block 212. In addition, in response to a user request, a new virtual sensor template can be added to a directory having the plurality of virtual sensor templates at block 214. The new virtual sensor template can be used to create one or more new virtual sensors in real-time.

Figure 2B:
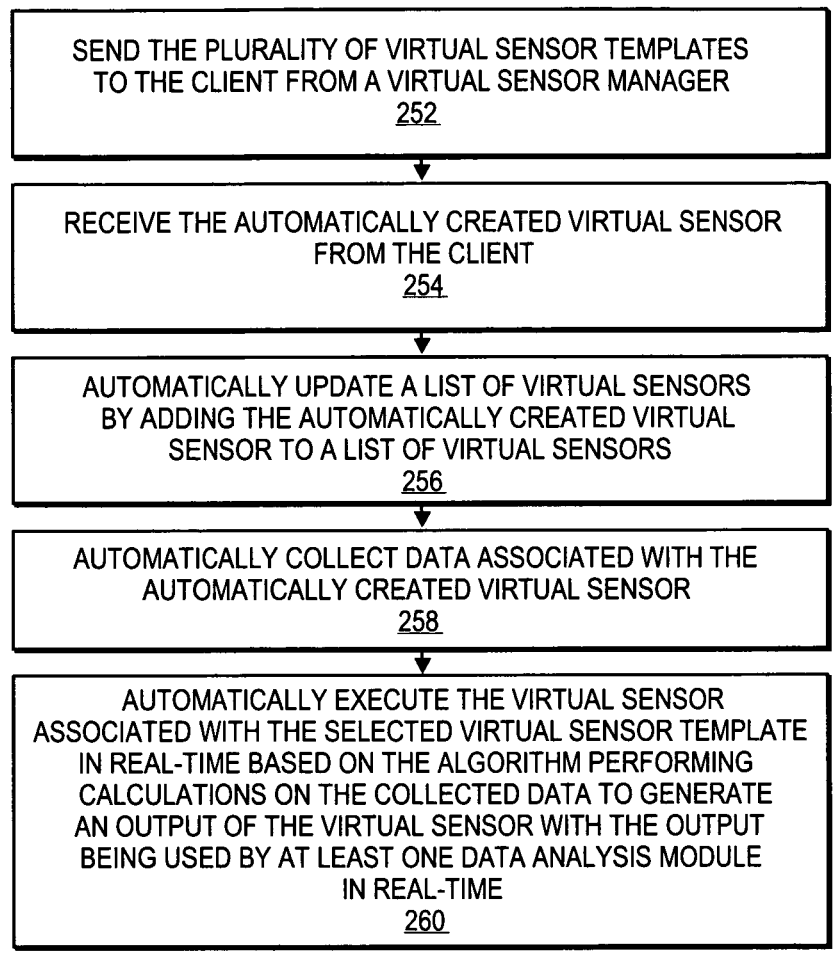
FIG. 2B illustrates a flow diagram of another embodiment for a method of automatically providing a virtual sensor in real-time.

FIG. 2B illustrates a flow diagram of one embodiment for a server-based method of automatically creating real-time virtual sensors. The method may be performed by processing logic that may comprise hardware (e.g., circuitry, dedicated logic, programmable logic, microcode, etc.), software (such as instructions run on a processing device), or a combination thereof. In one embodiment, the method is performed by a server (e.g, the statistical process monitoring apparatus 105 of FIG. 1).

Referring to FIG. 2B, the method begins by sending a plurality of virtual sensor templates to the client from a virtual sensor manager at block 252. The method further includes receiving the automatically created virtual sensor from the client at block 254 as discussed above. The method further includes automatically updating a list of virtual sensors by adding the automatically created virtual sensor to the list of virtual sensors at block 256.

The method further includes automatically collecting data associated with the automatically created virtual sensor at block 258. The method further includes automatically executing the automatically created virtual sensor associated with the selected virtual sensor template in real-time based on an algorithm performing calculations on the collected data to generate an output of the virtual sensor with the output being used by at least one data analysis module in real-time at block 260.

The collected data can be acquired from one or more of manufacturing machines, sensors, physical sensors, process controllers, virtual sensors, configuration data, and/or databases. The collected data may include, for example, chamber temperature, pressure, gas flow rates, etc. The selected data used by the virtual sensor can be formed from a combination of data sources including at least one of the following: a database, a machine tool, a real sensor attached to the machine tool, an external physical sensor associated with the machine tool, and one or more additional virtual sensors. The collected data may be indicative of a fault if, for example, the temperature is too high or too low, the gas flow rates are erratic, the pressure is different than is required for a current process, etc.

An error notification in real-time can be generated based on a data analysis module analyzing the output of the virtual sensor in real-time. A machine tool can be stopped in real-time in response to the data analysis module analyzing the output of the virtual sensor in real-time and determining a fault condition.

In one embodiment, a tool records temperature set-points and temperature readings on a continuous basis during process conditions. This data is transferred to the database via a communication link. A dynamically created virtual sensor generates temperature error data in real-time based on the temperature set-point and temperature reading data. The temperature error data is sent to a data analysis module during real-time for analysis and corrective action taken if necessary.

Other examples for a virtual sensor or CDT include the following: minimum, maximum, standard deviation during recipe steps range; moving average of pressure reading during specific recipe step for specific process recipe; average value of a plurality of temperature sensors during the recipe step; and width of temperature peak for a certain temperature degree deviation from maximum during a recipe (e.g., 50 degree).

Prior approaches would have required creating a new built in algorithm, documenting the new algorithm, releasing a new software version or update with the new algorithm, restarting or rebooting each tool that requires the new algorithm, evaluating the algorithm under test conditions, and then performing analysis with the new algorithm. These prior approaches are not able to automatically create CDTs using CDT templates on a real-time basis. These prior approaches are also not able to create one or more CDT templates and then CDTs on a real-time basis.

Figure 3:
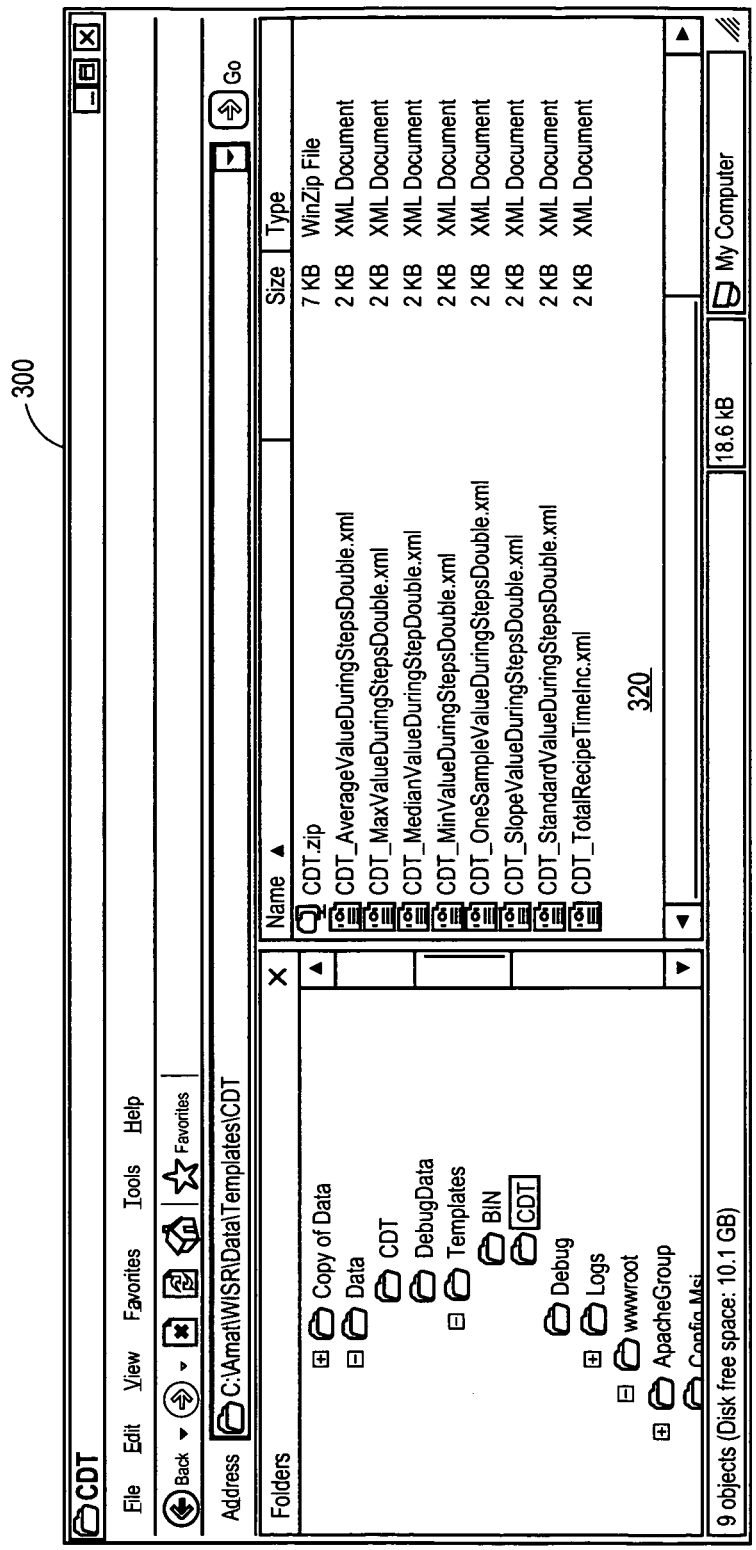
FIG. 3 illustrates an exemplary user interface presenting virtual sensors deployed on a server, in accordance with one embodiment of the invention.

FIG. 3 illustrates an exemplary user interface presenting virtual sensors deployed on a server, in accordance with one embodiment of the invention. Each XML file on the right hand side 320 of the screen 300 represents a different virtual sensor. In one embodiment, a virtual sensor is a calculated data tag (CDT) that can not be collected directly from a tool, but is calculated using data collected from the tool or other CDT's data. For example, a CDT named "Average Pressure During Recipe Step" calculates an average of a data tag ("Pressure"). The average is calculated on an interval defined by changing a value of another data tag "Recipe Step." Each time a recipe step value is changed, a CDT calculates the average of pressure for the time interval between a current and a previous change of the recipe step value.

A CDT template is described in more detail below. A CDT template is a definition of CDT in source format (e.g., XML format) or binary (e.g., compiled .Net assembly) form. For example, binary form is derived from XML when XML is parsed and assembly is compiled based on the definition. The statistical process monitoring apparatus 105 can support binary CDTs as well. A CDT template can be installed in binary format as compiled assembly such that others can not see the code behind the CDT template.

In order to use a single template for performing the same calculations on different data tags, for example, "average Pressure during step" and "average Temperature during step," the template may have parameters which are stored as part of CDT configuration and are passed to a CDT object when it is instantiated. The template contains public methods, which allow obtaining needed information associated with these parameters. This information is used by a CDT wizard to help a user to provide correct configuration for a particular CDT.

In order for a CDT to become available in the statistical process monitoring apparatus 105 as a data tag it should be configured in a dscdt.xml file directory of the virtual sensor manager 190. Configuration establishes correspondence between the particular CDT, which a user collects and the CDT template. Configuration includes common fields like description, location, index, side and slot. Parameters are configured as part of <VID> element using ":"symbol as delimiter.

Figure 4:
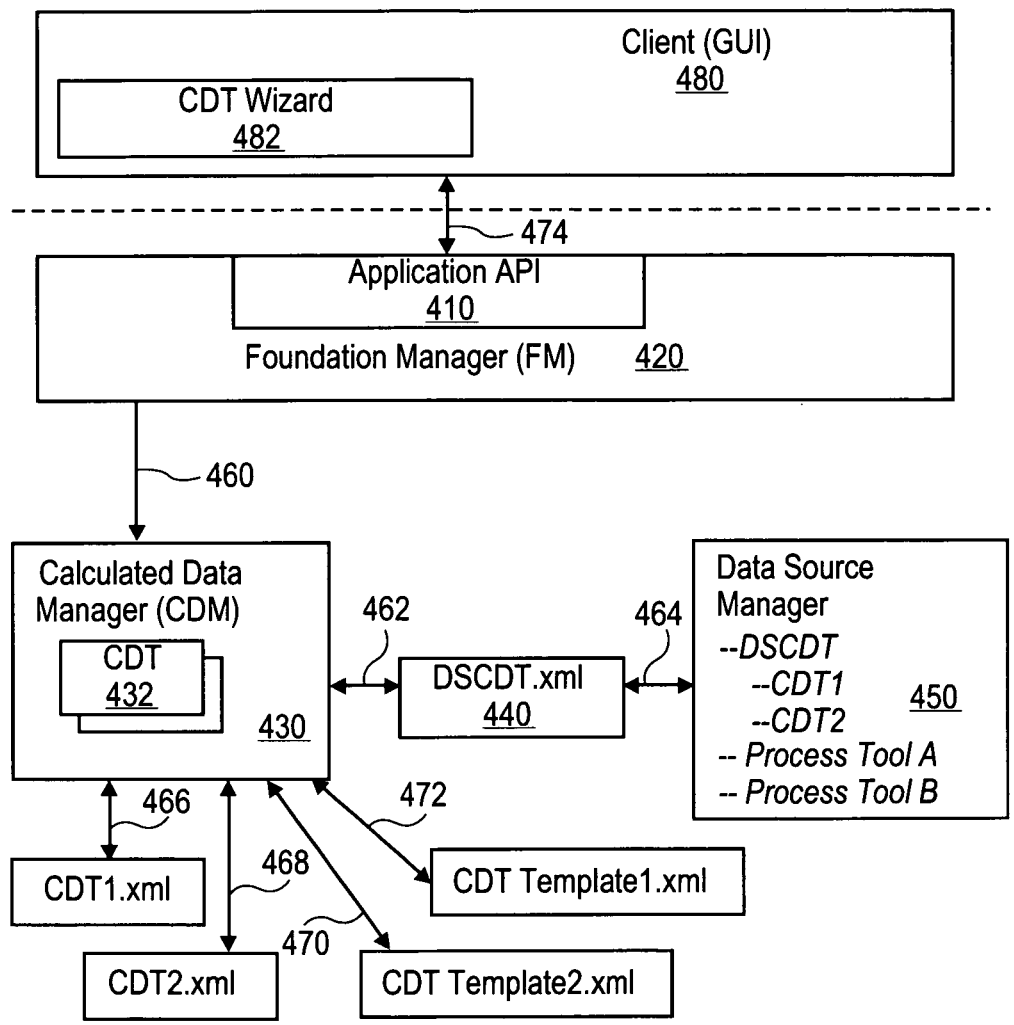
FIG. 4 illustrates one embodiment of a software model for CDT design.

FIG. 4 illustrates a software model for CDT design. An application programming interface (API) 410 interfaces with a foundation manager 420 and a client application (GUI) 480 having a CDT wizard 482. The foundation manager 420 communicates with a calculated data manager (CDM) 430 via a link 460. The CDT wizard 482 automatically creates calculated data tag xml files (e.g., CDT1.xml, CDT2.xml) using inputs received from the graphical user interface (GUI) that select a data source and parameters to configure the CDT using a CDT template (e.g., CDT Template1.xml, CDT Template2.xml).

In certain embodiments, more than one CDT can be created using a single CDT template. A CDT manager (CDM) 430 generates a special data source (DSCDT) xml file directory 440 with configuration xml file(s) for the calculated data tags (e.g., CDT 432). In one embodiment, the file directory 440 includes a list of CDTs such as CDT_chamberA, CDT_chamberB. The data source manager 450 can be communicatively coupled to various data sources such as a database and/or machine tools. The data source manager 450 reads the file directory 440 and creates appropriate attributes for the CDTs. The data source manager 450 also includes different types of data sources, real (e.g., process tool A, process tool B) and virtual data sources (e.g., CDT1, CDT2). Various bi-directional links 460, 462, 464, 466, 468, 470, 472, and 474 allow the different managers and applications to communicate.

Figure 5:
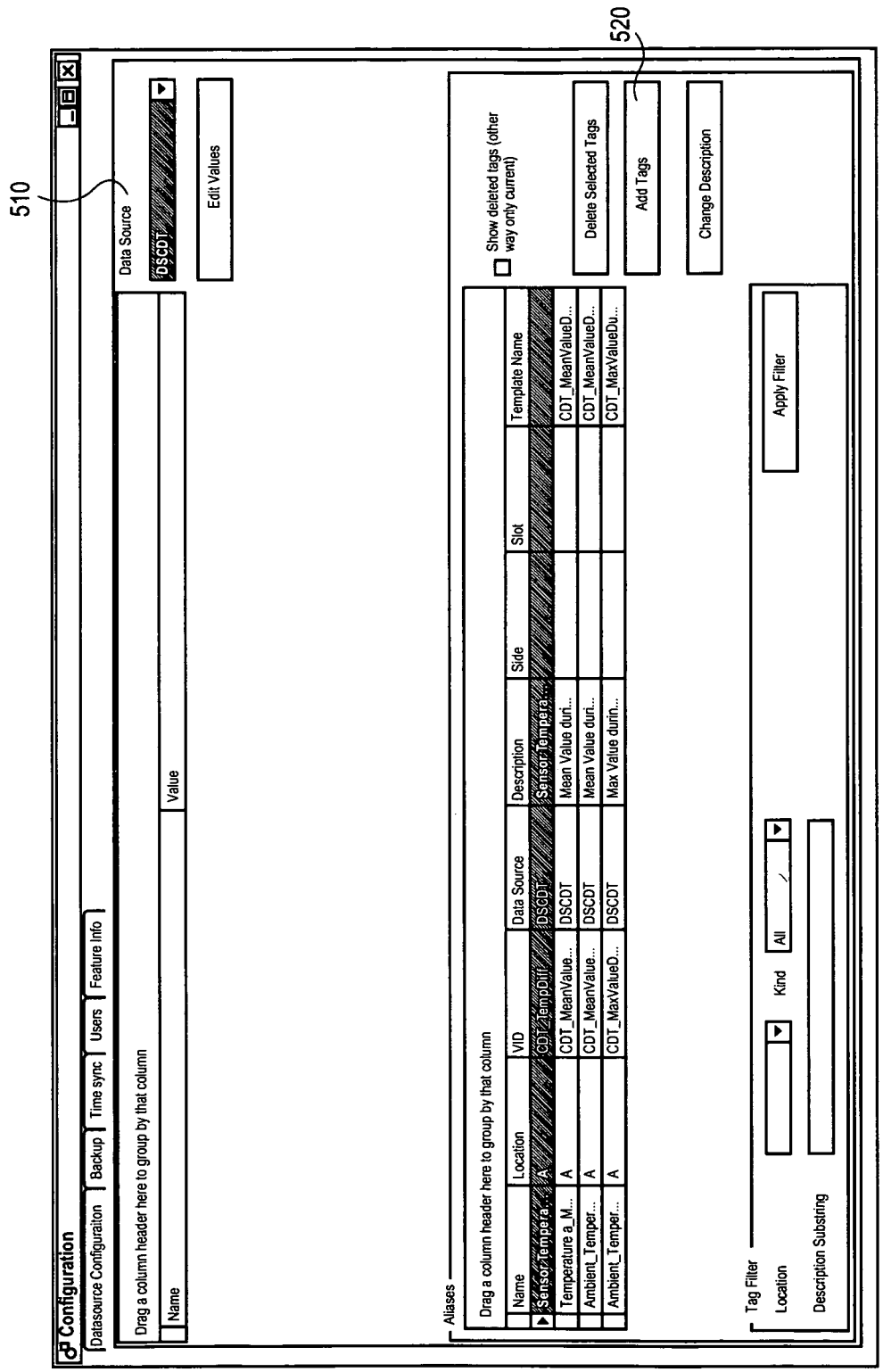
FIG. 5 illustrates an exemplary data source configuration user interface for automatically providing a CDT in real-time in accordance with one embodiment of the invention.
Figure 6:
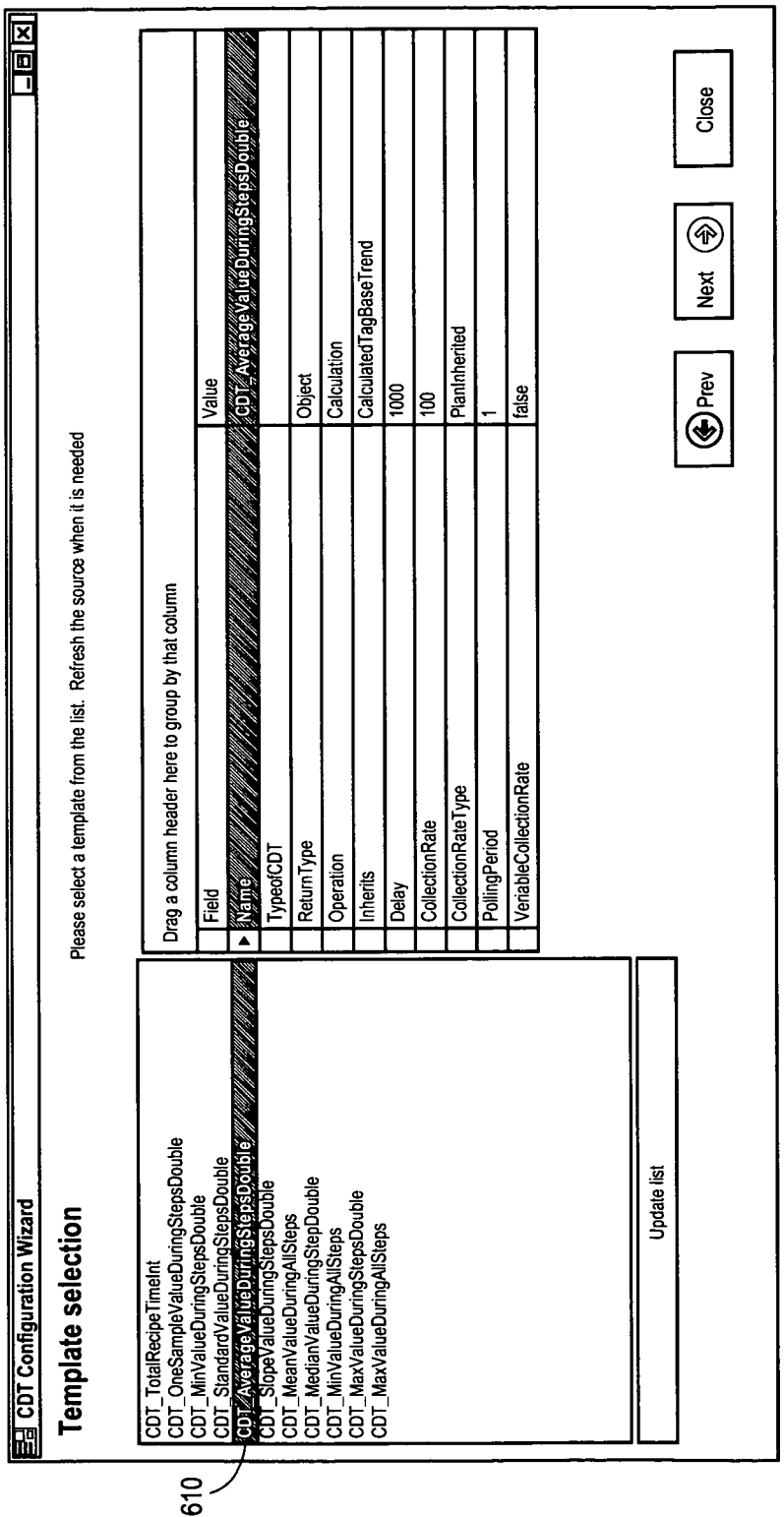
FIG. 6 illustrates an exemplary CDT configuration user interface for selecting a CDT template in accordance with one embodiment of the invention.
Figure 7:
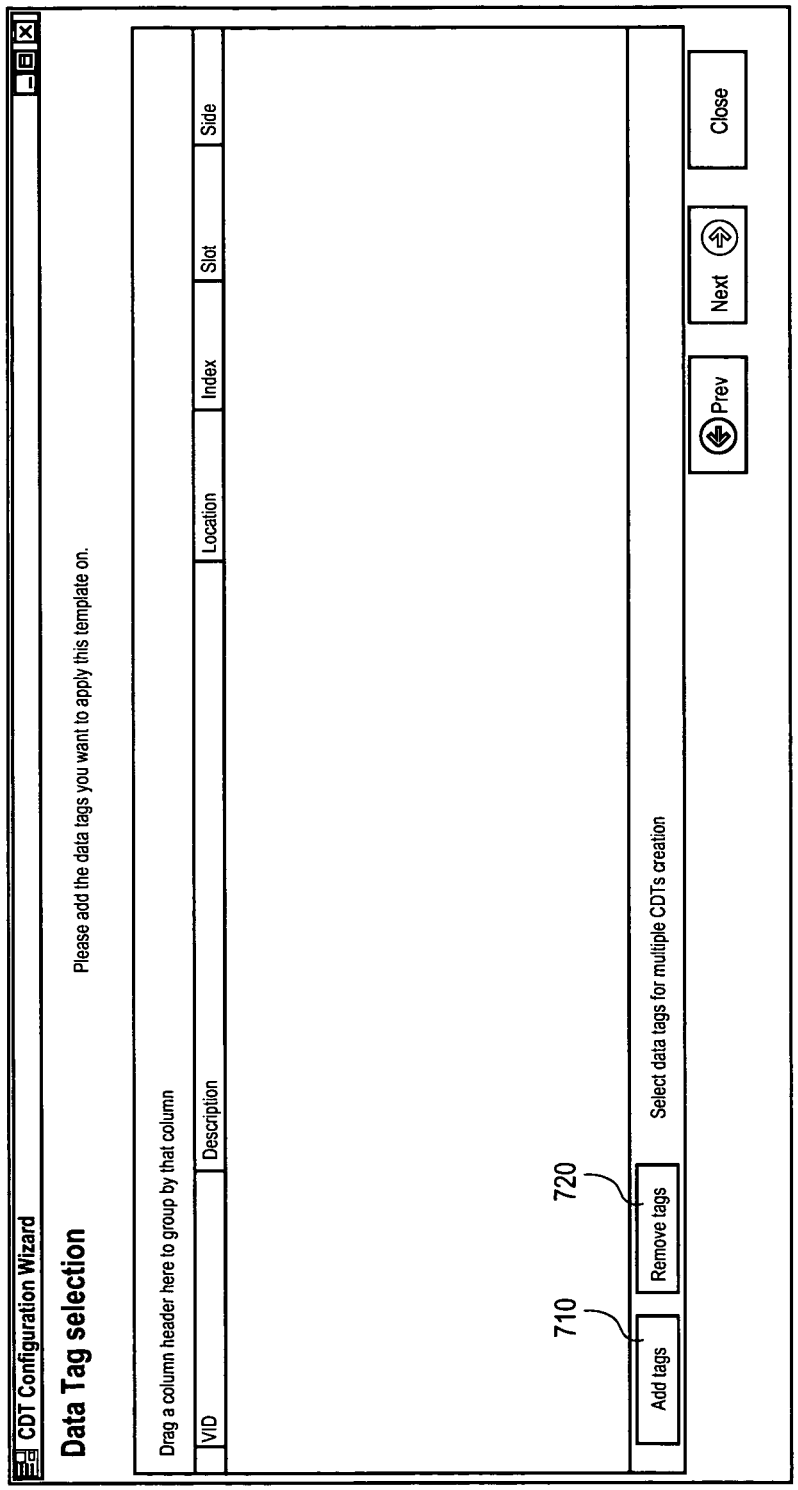
FIG. 7 illustrates an exemplary CDT configuration user interface for selecting one or more data tags in accordance with one embodiment of the invention.

FIGS. 5-14 illustrate exemplary user interfaces provided by a CDT configuration wizard. FIG. 5 illustrates an exemplary data source configuration user interface of the CDT wizard according to one embodiment. A user selects data source 510 "DSCDT," which is a directory that stores CDTs. The data source configuration window then displays a list of currently available CDTs such as Sensor Temperature, Temperature_MeanValue, and Ambient_Temperate. A user can then decide to add a new CDT. He may start b selecting Add Tags 520. This generates a dialog that allows selection of a CDT template for a new CDT as illustrated in FIG. 6 which is an exemplary CDT configuration wizard user interface for selecting a CDT template in accordance with one embodiment. A CDT template is a file that contains a specific formula or algorithm, for performing desired functionality.

In one embodiment, a user selects a particular CDT template such as AverageValueDuringStepsDouble 610. This CDT template allows the creation of a new CDT for any tag (e.g., sensor reading) and any recipe step that the user selects.

After selecting a CDT template as discussed above, FIG. 7 illustrates an exemplary CDT configuration user interface for selecting one or more data tags, according to one embodiment. The CDT configuration illustrates a dialog that allows a user to select one or more parameters such as data tags to configure the CDT to be created. In certain embodiments, these data tags represent actual sensor data collected from a machine tool. A user can add or remove tags by selecting the appropriate button, 710 or 720. A data tag may be characterized by its identification (VID), description, location, index, slot, and side information.

Figure 8:
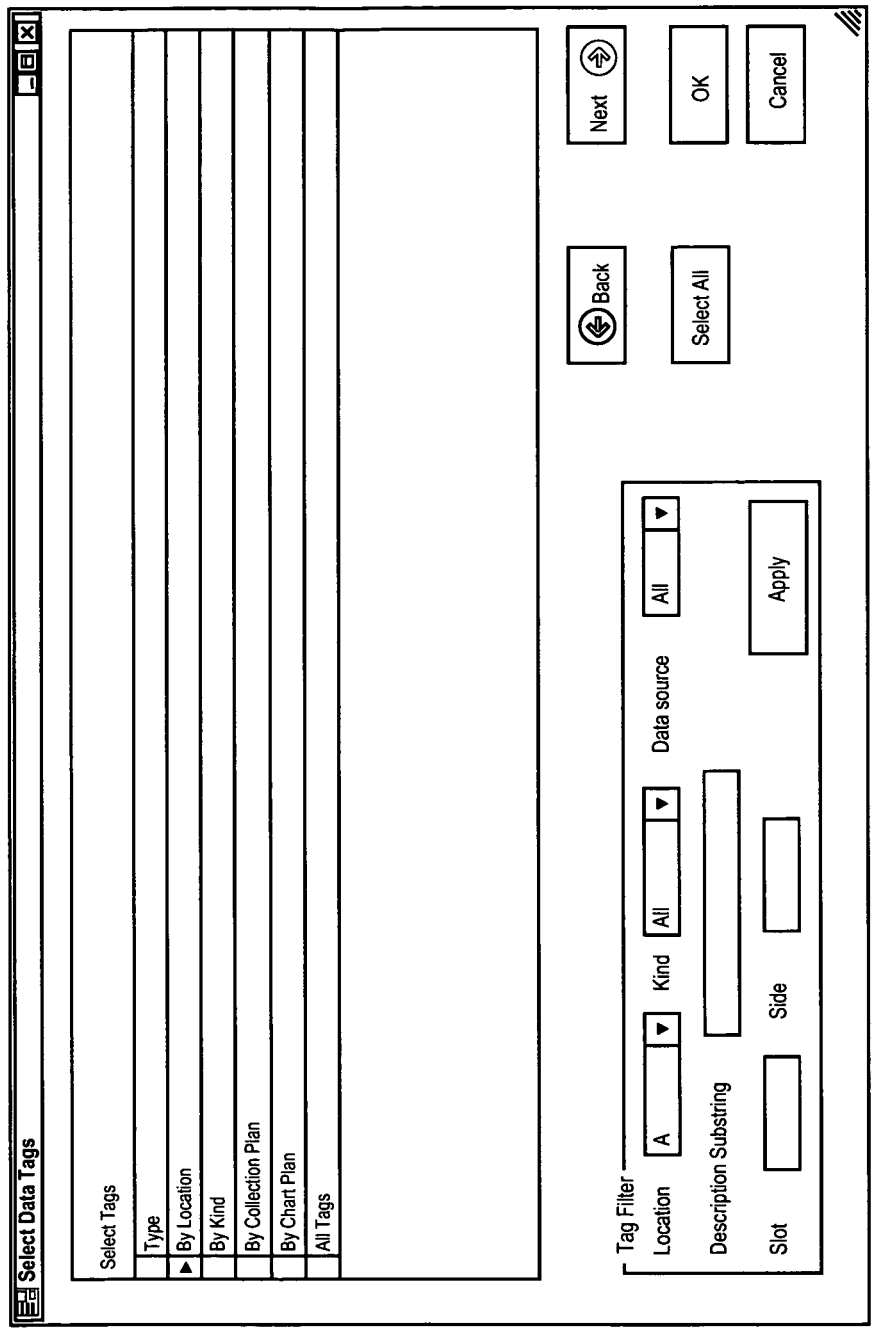
FIG. 8 illustrates an exemplary CDT configuration user interface for filtering one or data tags in accordance with one embodiment of the invention.

FIG. 8 illustrates an exemplary CDT configuration user interface for filtering one or more data tags, according to one embodiment. A data tag can be filtered by location, kind, collection plan, chart plan, and/or selected from a list of all tags.

FIG. 9 illustrates an exemplary CDT configuration user interface selecting a particular data tag, according to one embodiment. A list of data tags is generated by filtering all data tags from a location of chamber A. A user can then select a particular data tag, Ambient Temperature 910 for sensor probe 4 in chamber A, as illustrated in FIG. 9.

Figure 10:
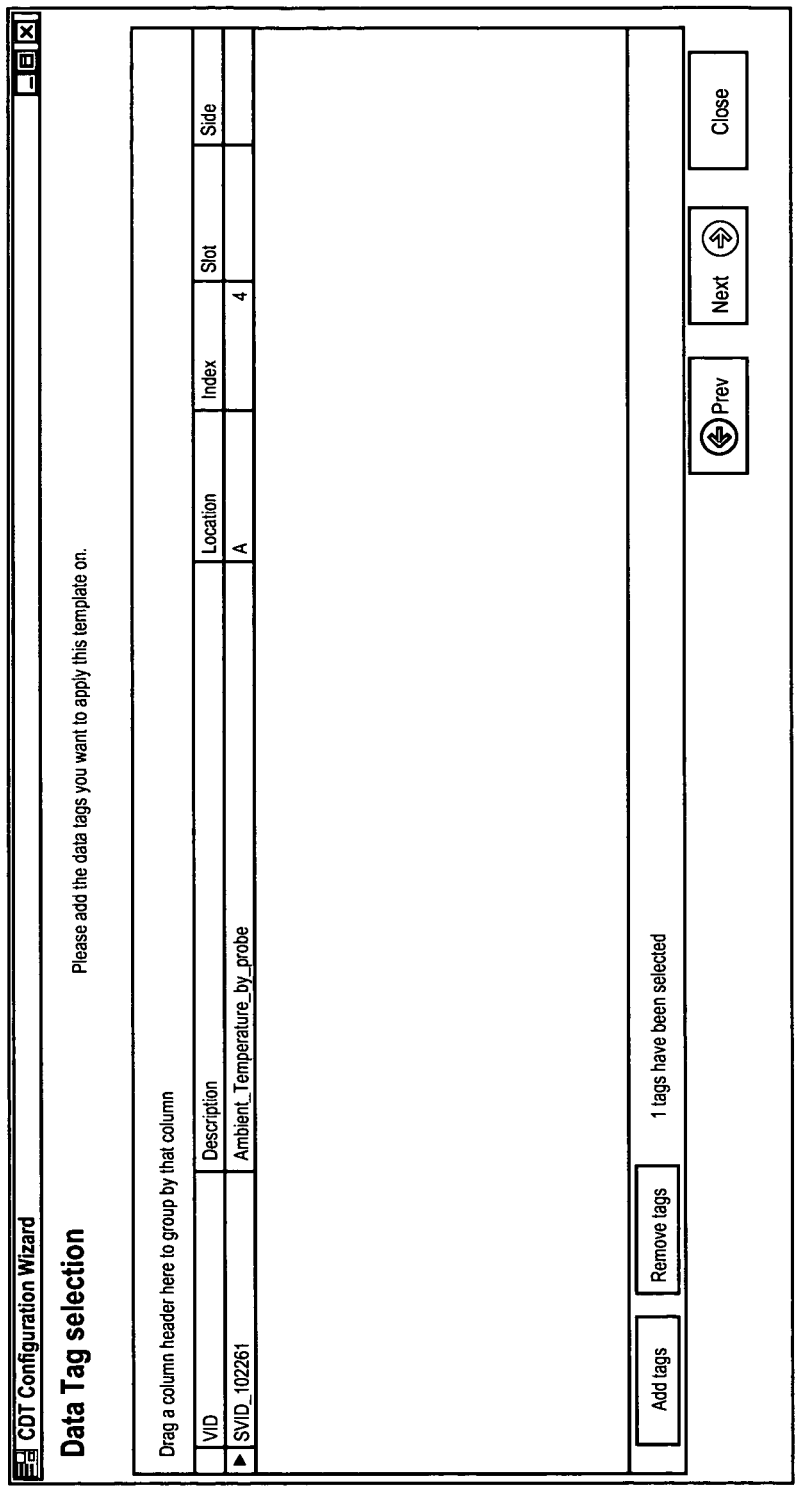
FIG. 10 illustrates an exemplary CDT configuration user interface after selecting a particular data tag in accordance with one embodiment of the invention.

FIG. 10 illustrates an exemplary CDT user interface showing data tag selection, according to one embodiment. Additional tags can be added or removed from the CDT wizard.

Figure 11:
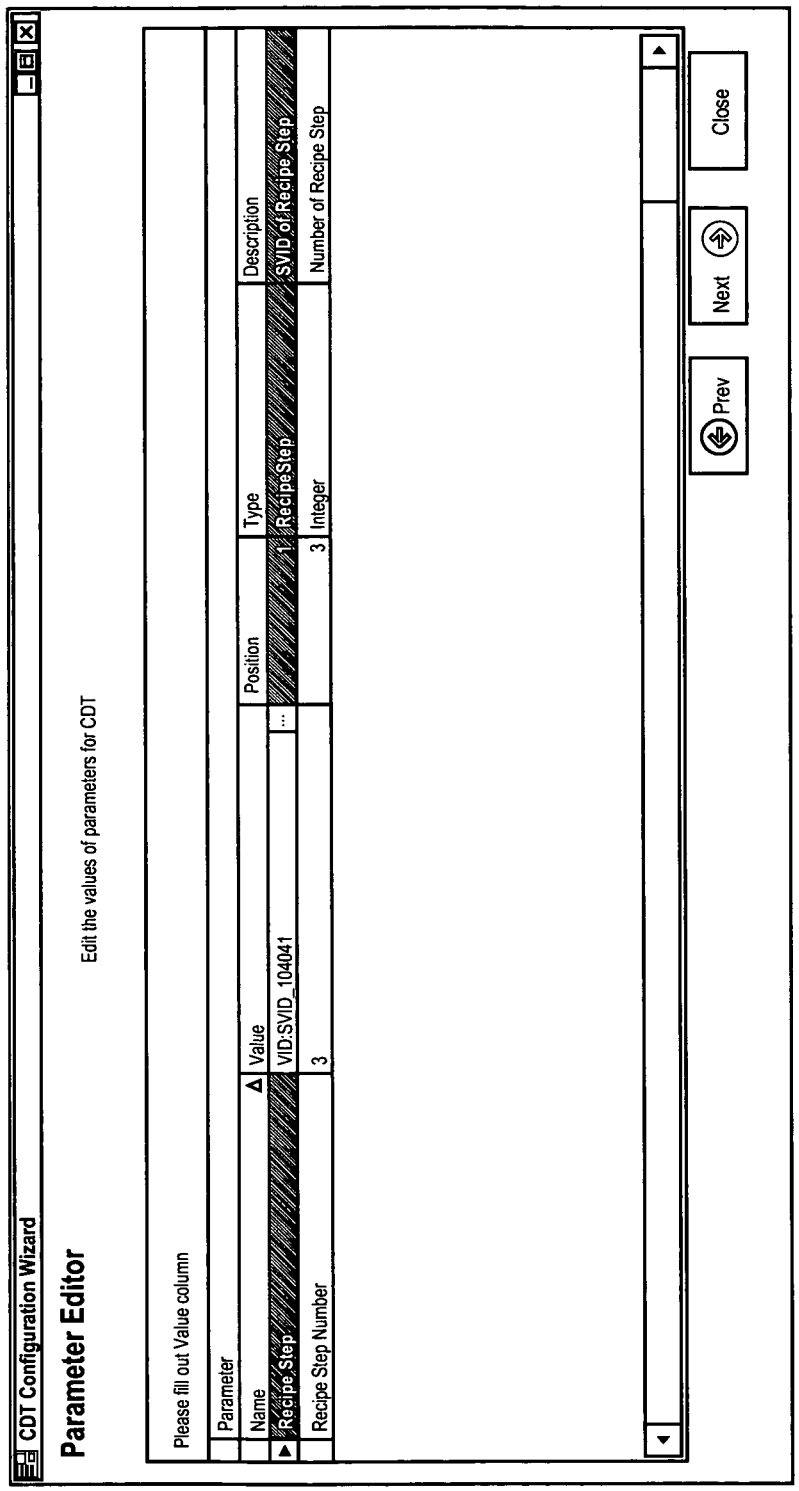
FIG. 11 illustrates an exemplary CDT configuration user interface for a parameter editor in accordance with one embodiment of the invention.

FIG. 11 illustrates an exemplary CDT configuration user interface for a parameter editor in accordance with one embodiment. Parameters are specific for each CDT template. For the template previously selected above, AverageValueDuringStepsDouble, there is a single parameter, recipe step, that can be edited. A value of the recipe step can be selected in the CDT wizard dialog as illustrated in FIG. 11. Recipe step number 3 is selected in this example.

Figure 12:
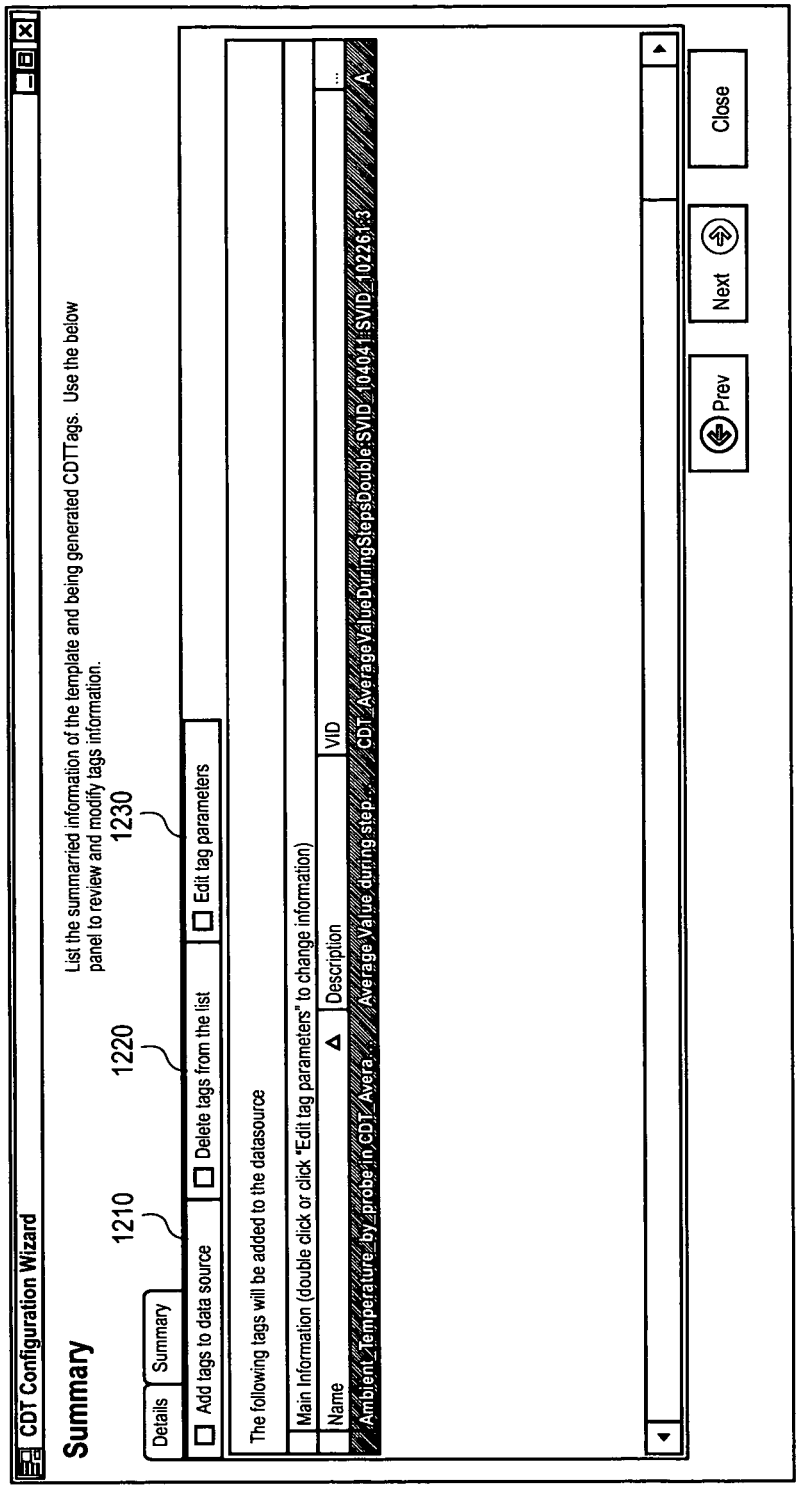
FIG. 12 illustrates an exemplary CDT configuration user interface for automatically creating a new CDT in accordance with one embodiment of the invention.

FIG. 12 illustrates an exemplary CDT configuration user interface for automatically creating a new CDT in accordance with one embodiment. This screen shot displays summarized information of the CDT template and the new CDT. A user can then select the add tags to data source button 1210 and the CDT wizard automatically creates the new CDT and the CDT manager 430 updates the list of CDT files in the DSCDT.xml file directory 440 illustrated in FIG. 4. A user can also delete tags from the list using the button 1220 and edit tag parameters with the button 1230.

Figure 13:
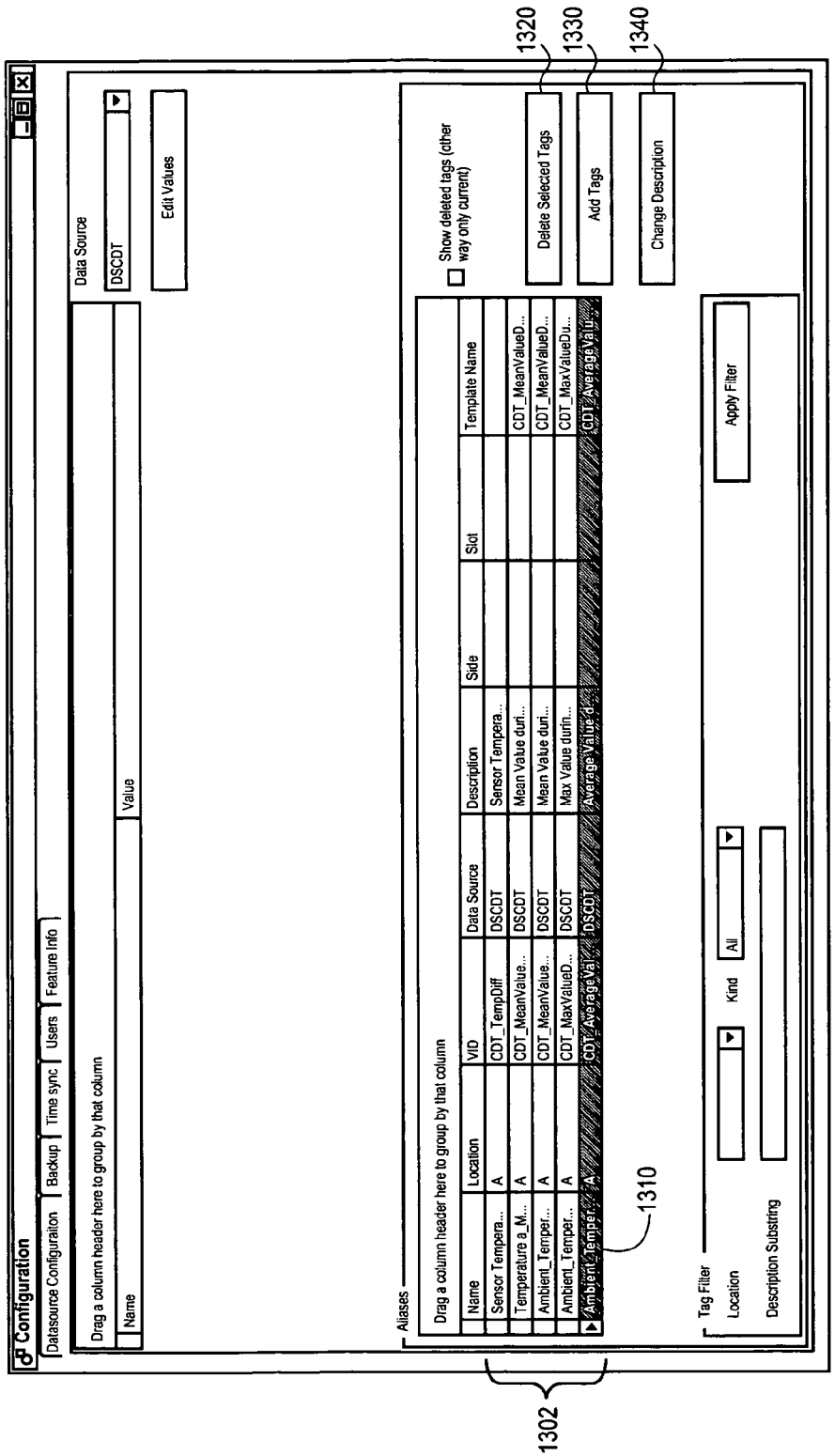
FIG. 13 illustrates an exemplary user interface for providing a list of CDTs in accordance with one embodiment of the invention.

FIG. 13 illustrates an exemplary user interface for providing a list of CDTs in accordance with one embodiment. The automatically created CDT, Ambient_Temperature 1310, appears at the bottom of the list 1302. A user can delete selected tags with button 1320, add tags with button 1330, and change description of a selected CDT with button 1340.

Figure 14:
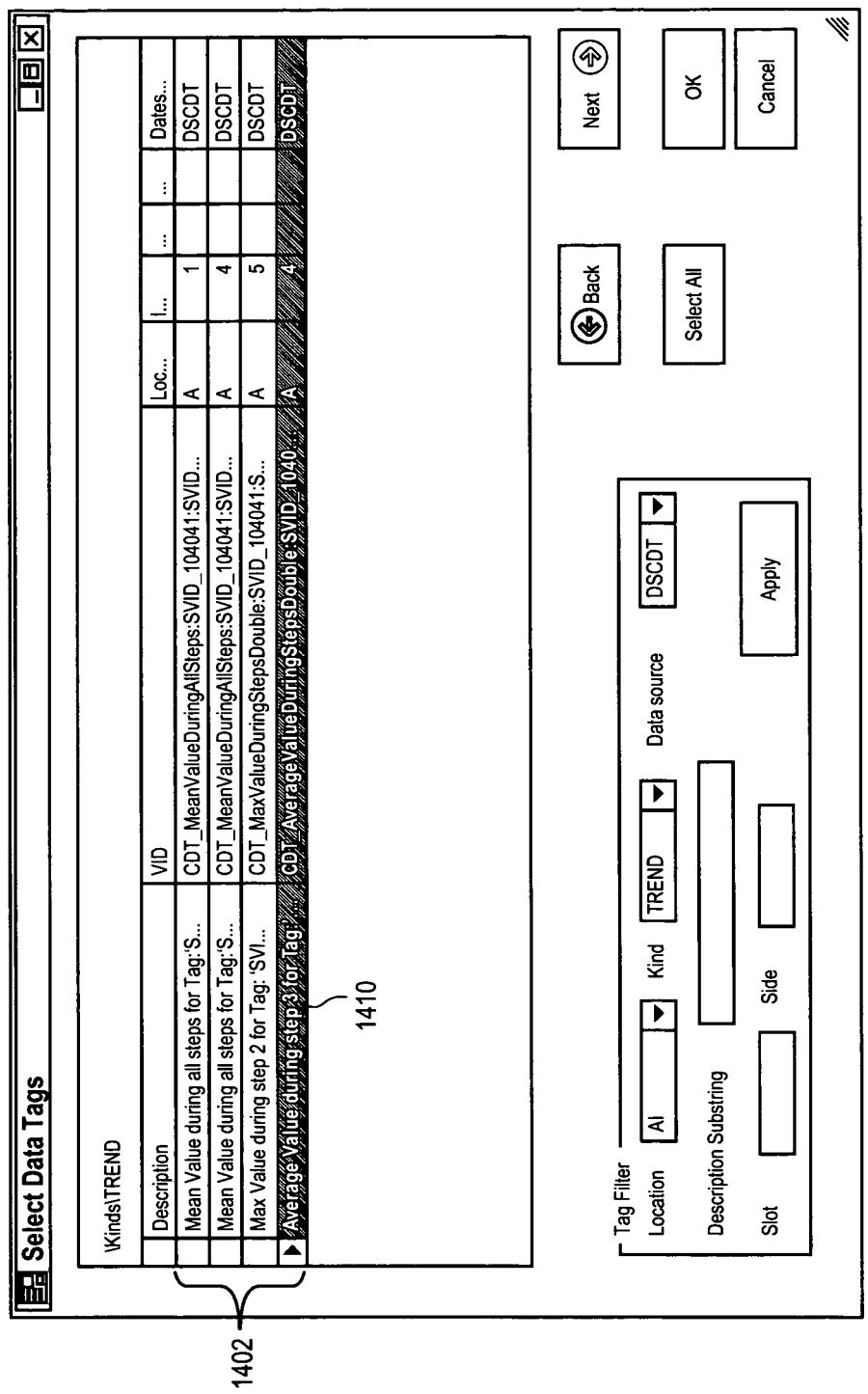
FIG. 14 illustrates an exemplary user interface for selecting a CDT for data collection in accordance with one embodiment of the invention.

FIG. 14 illustrates an exemplary user interface for selecting a CDT for data collection in accordance with one embodiment. A user can select a CDT for data collection in the dialog illustrated in FIG. 14 with the new CDT 1410 being at the bottom of the list 1402. A SPC module (e.g., SPC 184) then automatically collects the necessary data specified by the CDT. For this CDT, the raw data tags include ambient temperature and recipe step as previously discussed. The SPC module also automatically performs the calculations specified by the selected CDT and provides the CDT result for storage, charting, and further analysis.

Virtual sensors or CDTs are applicable for research and development groups that require complex logic for data analysis. Virtual sensors can be easily developed with new analysis algorithms that can be deployed in real-time "on-the-fly" during data collection. Data can be collected and analyzed during in real-time even though the software application does not provide the needed data itself. Virtual sensors enable the receiving of results in real-time in order to adjust algorithms accordingly in real-time.

Virtual sensors are also applicable for process and diagnostic groups that benefit from receiving real-time notifications based on virtual sensor values. Data analysis modules (e.g., SPC, APC, chamber matching) are supported by virtual sensors. These groups also benefit from using derivate metrics based on virtual sensors for hardware matching and qualification.

Virtual sensors enable users of manufacturing machines to collect and analyze data in real-time for research and development, process monitoring and diagnostics, and hardware matching. A virtual sensor mechanism implemented in a SPC software application decreases the cost of implementation and deployment of different data analysis applications such as SPC, APC, and hardware matching. Virtual sensors allow users to implement their own algorithms protected with intellectual property while also leveraging the SPC application capabilities for advanced process control and monitoring and data analysis applications.

Figure 15:
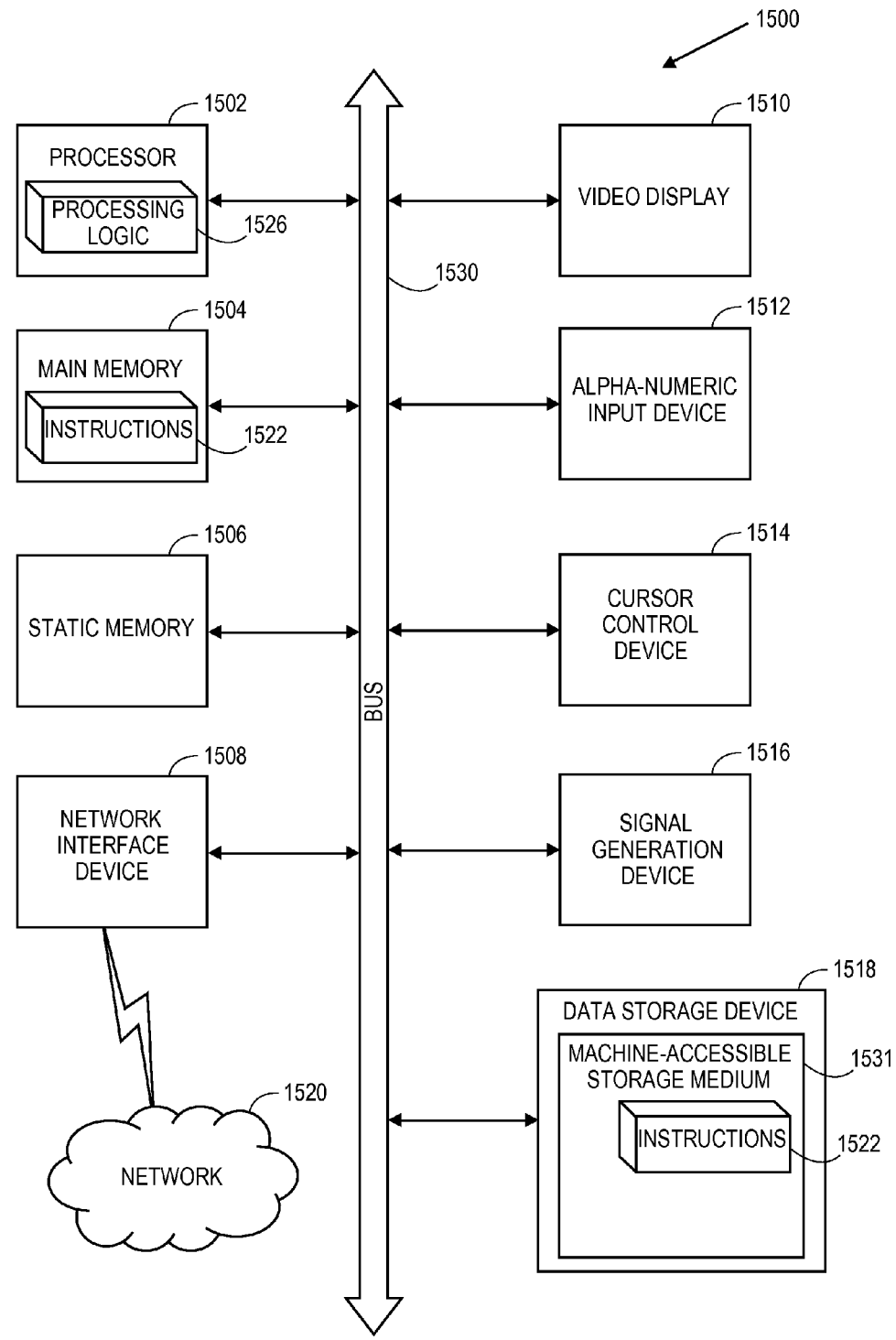
FIG. 15 illustrates a diagrammatic representation of a machine in the exemplary form of a computer system within which a set of instructions, for causing the machine to perform any one or more of the methodologies discussed herein, may be executed.

FIG. 15 illustrates a diagrammatic representation of a machine in the exemplary form of a computer system 1500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1500 includes a processing device (processor) 1502, a main memory 1504 (e.g., read-only memory (ROM), flash memory, dynamic random access memory (DRAM) such as synchronous DRAM (SDRAM) or Rambus DRAM (RDRAM), etc.), a static memory 1506 (e.g., flash memory, static random access memory (SRAM), etc.), and a data storage device 1518, which communicate with each other via a bus 1530.

Processor 1502 represents one or more general-purpose processing devices such as a microprocessor, central processing unit, or the like. More particularly, the processor 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1502 may also be one or more special-purpose processing devices such as an application specific integrated circuit (ASIC), a field programmable gate array (FPGA), a digital signal processor (DSP), network processor, or the like. The processor 1502 is configured to execute the processing logic 1526 for performing the operations and steps discussed herein.

The computer system 1500 may further include a network interface device 1508. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1516 (e.g., a speaker).

The data storage device 1518 may include a machine-accessible storage medium 1531 on which is stored one or more sets of instructions (e.g., software 1522) embodying any one or more of the methodologies or functions described herein. The software 1522 may also reside, completely or at least partially, within the main memory 1504 and/or within the processor 1502 during execution thereof by the computer system 1500, the main memory 1504 and the processor 1502 also constituting machine-accessible storage media. The software 1522 may further be transmitted or received over a network 1520 via the network interface device 1508.

The machine-accessible storage medium 1531 may also be used to store data structure sets that define user identifying states and user preferences that define user profiles. Data structure sets and user profiles may also be stored in other sections of computer system 1500, such as static memory 1506.

While the machine-accessible storage medium 1531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to automatically provide a virtual sensor in real-time, comprising:
   providing a plurality of virtual sensor templates to a display on a computer system, the plurality of virtual sensor templates include different types of data tags and associated parameters of process recipes;
   selecting, based on user input received with the computer system, one or more virtual sensor templates from a plurality of virtual sensor templates, each virtual sensor template including the one or more selected virtual sensor templates having an algorithm to provide a desired functionality including at least one of fault detection, error detection, and process monitoring in real-time during data collection for semiconductor manufacturing;
   selecting, with the computer system, at least one parameter to configure the one or more selected virtual sensor templates; and
   automatically creating a first virtual sensor configured from the one or more selected virtual sensor templates.

2. The method of claim 1, further comprising:
   sending the first virtual sensor to the server, wherein each virtual sensor template to define a format of a virtual sensor based on an extensible markup language (xml).

3. The method of claim 1, further comprising:
   automatically updating a list of virtual sensors having at least one virtual sensor that is associated with one or more manufacturing machines by adding the first virtual sensor to the list of virtual sensors;
   automatically collecting data associated with the first virtual sensor; and
   automatically executing the first virtual sensor associated with the selected virtual sensor template in real-time based on the algorithm performing calculations on the collected data to generate an output of the first virtual sensor with the output being used by at least one data analysis module in real-time.

4. The method of claim 3, further comprising:
   acquiring the collected data from at least one of an external physical sensor associated with a machine tool, a second virtual sensor, a database, the machine tool, and a real sensor attached to the machine tool.

5. The method of claim 3, further comprising:
   analyzing the output of the first virtual sensor in real-time;
   generating an error notification in real-time based on the at least one data analysis module analyzing the output of the first virtual sensor in real-time; and
   stopping a machine tool that is associated with the first virtual sensor if the data analysis module determines a fault condition.

6. The method of claim 1, wherein selecting at least one parameter to configure the one or more selected virtual sensor templates further comprises:
   selecting at least one data tag associated with a data source; and
   selecting values of at least one parameter associated with the selected virtual sensor template.

7. The method of claim 6, wherein selecting the at least one data tag comprises filtering a list of data tags by at least one of location, kind, collection plan, and chart plan.

8. The method of claim 7, further comprising adding the at least one selected data tag to the one or more selected virtual sensor templates.

9. The method of claim 1, further comprising:
   adding a new virtual sensor template to a directory having the plurality of virtual sensor templates in real-time.

10. A non-transitory machine-accessible medium including data that, when accessed by a machine, cause the machine to perform a method comprising:
    providing a plurality of virtual sensor templates to a display on a computer system, the plurality of virtual sensor templates include different types of data tags and associated parameters of process recipes;
    selecting, based on user input, one or more selected virtual sensor templates from a plurality of virtual sensor templates, each virtual sensor template including the one or more selected virtual sensor templates having an algorithm to provide a desired functionality including at least one of fault detection, error detection, and process monitoring in real-time during data collection for semiconductor manufacturing;
    selecting, with the computer system, at least one parameter to configure the one or more selected virtual sensor templates; and
    automatically creating a first virtual sensor configured from the one or more selected virtual sensor templates.

11. The non-transitory machine-accessible medium of claim 10, further comprising:
    sending the first virtual sensor to the server, wherein each virtual sensor template to define a format of a virtual sensor based on an extensible markup language (xml).

12. The non-transitory machine-accessible medium of claim 10, the method further comprising:
    automatically updating a list of virtual sensors having at least one virtual sensor that is associated with one or more manufacturing machines by adding the first virtual sensor to the list of virtual sensors;
    automatically collecting data associated with the first virtual sensor; and
    automatically executing the first virtual sensor associated with the one or more selected virtual sensor templates in real-time based on the algorithm performing calculations on the collected data to generate an output of the first virtual sensor with the output being used by at least one data analysis module in real-time.

13. The non-transitory machine-accessible medium of claim 12, the method further comprising:
    acquiring the collected data from at least one of an external physical sensor associated with a machine tool, a second virtual sensor, a database, the machine tool, and a real sensor attached to the machine tool.

14. The non-transitory machine-accessible medium of claim 10, wherein selecting at least one parameter associated with the one or more selected virtual sensor templates further comprises:
    selecting at least one data tag associated a data source; and
    selecting values of at least one parameter associated with the one or more selected virtual sensor templates.

15. The non-transitory machine-accessible medium of claim 14, wherein selecting the at least one data tag occurs by filtering a list of data tags by at least one of location, kind, collection plan, and chart plan.

16. The non-transitory machine-accessible medium of claim 15, the method further comprising adding the at least one selected data tag to the one or more selected virtual sensor templates.

17. The non-transitory machine-accessible medium of claim 10, the method further comprising:
   analyzing an output of the first virtual sensor in real-time;
   generating an error notification in real-time based on a data analysis module analyzing the output of the first virtual sensor in real-time; and
   stopping a machine tool that is associated with the first virtual sensor if the data analysis module determines a fault condition.

18. The non-transitory machine-accessible medium of claim 10, the method further comprising:
   adding a new virtual sensor template to a directory having the plurality of virtual sensor templates in real-time in order to create one or more new virtual sensors in real-time based on the new virtual sensor template.

* * * * *